No. 622,304. Patented Apr. 4, 1899.
H. N. WAYNE.
PNEUMATIC TIRE.
(Application filed June 15, 1898.)
(No Model.)
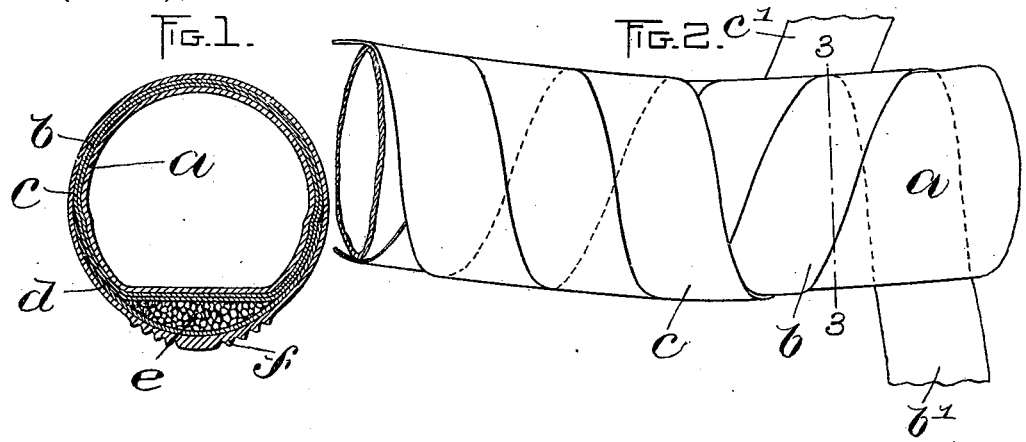
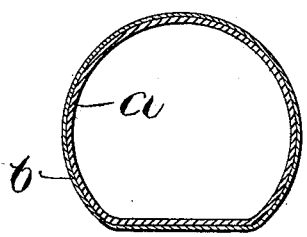
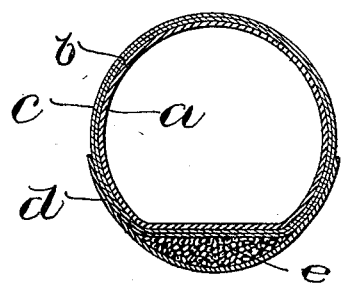
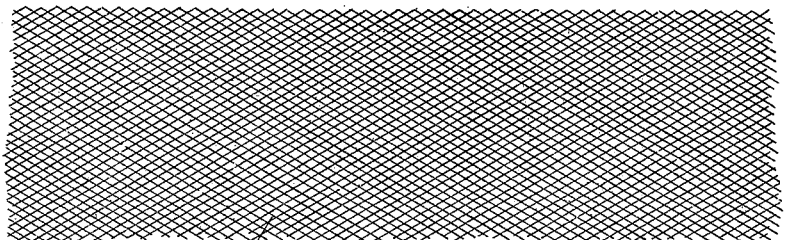
WITNESSES:
A. D. Harrison
P. W. Pezzetti
INVENTOR
Herbert N. Wayne

UNITED STATES PATENT OFFICE.

HERBERT N. WAYNE, OF NEWTON, MASSACHUSETTS, ASSIGNOR TO THE INTERNATIONAL RUBBER TIRE COMPANY, OF PORTLAND, MAINE.

PNEUMATIC TIRE.

SPECIFICATION forming part of Letters Patent No. 622,304, dated April 4, 1899.

Application filed June 15, 1898. Serial No. 683,480. (No model.)

*To all whom it may concern:*

Be it known that I, HERBERT N. WAYNE, of Newton, in the county of Middlesex and State of Massachusetts, have invented certain new and useful Improvements in Pneumatic Tires, of which the following is a specification.

This invention has for its object to provide a strong and durable pneumatic tire which shall be free from liability to be punctured by ordinary means.

The invention consists in the improvements which I will now proceed to describe and claim.

Of the accompanying drawings, forming a part of this specification, Figure 1 represents a transverse section of a completed tire embodying my invention. Fig. 2 represents a side elevation of a portion of the tire partially completed. Fig. 3 represents a section on line 3 3 of Fig. 2. Fig. 4 represents a view similar to Fig. 3, showing additional parts of the tire. Fig. 5 represents a side view of a portion of one of the helically-wound strips shown in Fig. 2. Fig. 6 represents a view of a portion of the protection-strip shown in Figs. 1 and 4.

The same letters of reference indicate the same parts in all the figures.

In the drawings, $a$ represents an air-tube of rubber, which is formed in the usual or any suitable way, of unvulcanized rubber. After forming the tube $a$ and before vulcanizing it I cover the tube with an inner confining-layer $b$, composed of a strip $b'$ of loosely-woven fabric, the cloth of the strip being cut straight, so that the warp-threads extend lengthwise of the strip, as shown in Fig. 5, said strip being treated with unvulcanized rubber in the usual manner to form frictioned stock. The strip $b'$ is wound helically upon the outer surface of the unvulcanized air-tube. Upon the inner layer $b$ I form an outer confining-layer $c$, composed of a strip $c'$ of frictioned stock similar to the strip $b'$ and wound helically upon the inner layer $b$, the direction of winding of the strip $c'$ being opposite to that of the strip $b'$, as shown in Fig. 2.

$d$ represents a protection-strip which is composed of close-woven fabric cut on the bias, as indicated in Fig. 6, and treated with unvulcanized rubber. The protection-strip $d$ is of sufficient width to extend across the tread portion of the tire and extend partly around the layers $b$ and $c$. I prefer to separate the central portion of the strip $d$ from the corresponding portion of the outer layer $c$ by a space or pocket which receives a cushion $e$, of sponge-rubber or other suitable material, adapted to protect the air-tube against puncturing means. When the sponge-rubber cushion $e$ is employed, the cushion is first formed and partly vulcanized to render it spongy and placed on the outer layer $c$, the latter, together with the inner layer in the air-tube, being made approximately flat to form a seat for the cushion $e$. The protection-strip $d$ is applied after the cushion and covers the outer surface of the cushion.

$f$ represents a covering-layer of rubber, which is applied in an unvulcanized condition and incloses the entire structure above described, the cover being preferably thickened and corrugated on the tread side of the tire.

The parts being assembled as above described, the whole is subjected to heat to vulcanize the rubber portions in the usual or any suitable manner, thus completing the tire.

I do not limit myself to the employment of a cushion $e$, as, if desired, all portions of the inner surface of the protection-strip $d$ could bear upon the outer layer $c$, the pocket and cushion being omitted.

I claim—

1. A pneumatic tire comprising an air-tube, a covering therefor composed of two layers of frictioned stock helically wound, said layers being wound in opposite directions, a protection-strip attached to the outer layer, and a coating of rubber covering the outer layer and the protection-strip.

2. A pneumatic tire comprising an air-tube, a fibrous covering helically wound thereon, a cushion on the outer side of said covering, a protection-strip secured to the covering at opposite edges of the cushion and extending across the outer face of the cushion, and a coating of rubber covering the outer layer and the protection-strip.

3. A pneumatic tire comprising an air-tube $a$ and fibrous covering therefor, the protection-strip $d$ extending over only a portion of the tube and covering, the covering-layer $f$ of rubber inclosing the tube, fibrous covering and protection-strip, a cushion being located between the protection-strip and the covering-layer $f$, the said parts being vulcanized together, substantially as described.

In testimony whereof I have affixed my signature in presence of two witnesses.

HERBERT N. WAYNE.

Witnesses:
A. D. HARRISON,
P. W. PEZZETTI.